United States Patent [19]

Shakushiro et al.

[11] Patent Number: 5,227,043

[45] Date of Patent: Jul. 13, 1993

[54] IONIC CONDUCTIVE POLYMER ELECTROLYTE AND CELL COMPRISING THE SAME

[75] Inventors: Kiyoaki Shakushiro; Ryo Nagai; Akira Kawakami, all of Osaka, Japan

[73] Assignee: Hitachi Maxell, Ltd., Osaka, Japan

[21] Appl. No.: 460,252

[22] Filed: Jan. 2, 1990

[30] Foreign Application Priority Data

Jan. 7, 1989 [JP] Japan .................... 1-1767
Jan. 7, 1989 [JP] Japan .................... 1-1768

[51] Int. Cl.$^5$ .......................... G01N 27/26
[52] U.S. Cl. ........................ 204/421; 252/510; 252/511
[58] Field of Search ............... 204/421, 59 R, 290 R, 204/98; 252/510, 511

[56] References Cited

U.S. PATENT DOCUMENTS

| | | | |
|---|---|---|---|
| 4,329,209 | 5/1982 | Johnson | 204/98 |
| 4,414,080 | 11/1983 | Williams et al. | 204/290 R |
| 4,636,286 | 1/1987 | DeLue et al. | 204/59 R |
| 4,882,243 | 11/1989 | Skotheim et al. | 429/192 |
| 4,925,544 | 5/1990 | Goldring | 204/421 |

FOREIGN PATENT DOCUMENTS

| | | |
|---|---|---|
| 0260847 | 3/1988 | European Pat. Off. |
| 0269018 | 6/1988 | European Pat. Off. |
| 0174894 | 3/1986 | France |
| WO8502718 | 6/1985 | PCT Int'l Appl. |
| WO8601643 | 3/1986 | PCT Int'l Appl. |
| WO8600185 | 12/1986 | PCT Int'l Appl. |
| WO8800215 | 1/1988 | PCT Int'l Appl. |
| WO8900771 | 1/1989 | PCT Int'l Appl. |

OTHER PUBLICATIONS

Textbook of Polymer Science 2nd Edition—Billmeyer Jr. 1971 pp. 67, 23–25, 231–233, 240–251, 366–367, 390, 391, 482–485.

Solid State Ionics, vol. 15, No. 3, Apr. 1985, pp. 233–240, Amsterdam, NL, A. Bouridah et al.: "Poly(dimethylsiloxane)-poly(ethylene oxide) based polyurethane networks used as electrolytes in lithium electrochemical solid state batteries"., Abstract, pp. 234–236.

Chemical Abstracts, vol. 104, No. 22, Jun. 1986, pp. 195–196, Abstract nr. 189688k, Columbus, Ohio, US; D. Fish et al.; "poly[(methoxyheptaethylene oxide)-methylsiloxane]/lithium perchlorate complexes as solvent-free polymerelectrolytes for high energy density storage devices", and Polym. Prepr. (Am. Chem. Soc., Div. Polym. Chem.) 1986, 27(1), 325–6 (Abstract).

Chemical Abstracts, vol. 109, No. 2, Jul. 1988, p. 174, abstract No. 9419v, Columbus, Ohio, US: and JP-A-63 55810 (Ube Industries Ltd) Oct. 3, 1988 (Abstract).

J. Appl. Phys., vol. 60, No. 4, Aug. 15, 1986, pp. 1342–1345, American Institute of Physics; K. J. Adamic et al.: "Ionic conductivity in solid, crosslinked dimethylsiloxane–ethylene oxide copolymer networks containing sodium".

Primary Examiner—John Niebling
Assistant Examiner—Bruce Bell
Attorney, Agent, or Firm—Birch, Stewart, Kolasch & Birch

[57] ABSTRACT

A novel ionic conductive polymer electrolyte comprising a cross linked silicon-containing polymer and a salt, which has a large ionic conductivity of at least $1 \times 10^{-5}$ S/cm.

36 Claims, 1 Drawing Sheet

IONIC CONDUCTIVE POLYMER ELECTROLYTE AND CELL COMPRISING THE SAME

BACKGROUND OF THE INVENTION

1. Field of the Invention

The present invention relates to an ionic conductive polymer electrolyte and a cell comprising the same. More particularly, the present invention relates to a lithium ionic conductive polymer electrolyte which can be used as an electrolyte for a lithium cell or an electrochromic display or in a sensor for lithium ion concentration or a lithium ion separating film.

2. Description of the Related Art

Many attempts have been made on an application of a polymer electrolyte which is flexible and formed in a film as a lithium ionic conductive solid electrolyte of a lithium cell and the like.

The polymer electrolyte consists of a complex comprising a lithium salt and an organic polymer in which the lithium salt is dissolved. When the polymer electrolyte is used in the lithium cell which is required to be thin and small by utilizing its characteristic that it can be easily formed in a film, it can improve the workability in the production of the cells and shielding effects and serve for reducing a production cost of the cell. Because of its flexibility, the polymer electrolyte may be useful as an electrolyte for an electrochromic display or as a sensor for lithium ion concentration.

As the organic polymer which constitutes the polymer electrolyte, many polymers are proposed such as polyethylene oxide (H. B. Armand, Fast Ion Transport in Solid, 131 (1979)), polyethyleneimine (T. Takahashi et al, Solid State Ionics, 18 & 19, 321 (1986)), polyethylene succinate (M. Watanabe et al, Macromolecules, 17, 2902 (1984)), cross-linked triol polyethylene oxide (Polymer Journal, 18(11), 809 (1986)) and the like.

Since the conventional polymer electrolytes have low lithium ion conductivity of $1 \times 10^{-8}$ to $1 \times 10^{-5}$ S/cm at 25° C., the lithium cell or other apparatus comprising it does not exhibit its performances satisfactorily when it is used at room temperature.

The ionic conductivity of the polymer electrolyte is induced by segmental motion of the polymer as suggested by D. F. Shriver et al (C. & En., 59 (1985)). The segmental motion of the polymer can relate to the free-volume, and the following ionic conduction equation is proposed (T. Miyamoto et al, J. Appl. Phys., 44(12) 5372 (1973) and M. Watanabe et al, J. Appl. Phys., 57 123 (1985)):

$$\sigma = q \times n \times \mu \quad \text{(i)}$$
$$= q \times n_0 \times \exp[-W/2\epsilon kT]\{qD/kT\} \times \exp[-rv_i/v_g(f_g + \alpha(T - T_g)] \quad \text{(ii)}$$

wherein
q: an electric charge,
n: the number of ionic carriers,
$\mu$: an ionic mobility,
$n_0$: a constant,
W: a dissociation energy of a salt,
$\epsilon$: a relative dielectric constant of a polymer,
k: the Boltzmann's constant,
$q_0$: a constant,
D: a diffusion constant,
r: a numerical factor,
$v_i$: a critical hole required fro ion motion,
$v_g$: a specific volume of at $T_g$,
$f_g$: a free-volume fraction at $T_g$,
$\alpha$: a thermal expansion coefficient of the free volume,
$T_g$: a glass transition temperature.

To increase the conductivity, the ionic mobility ($\mu$), which more greatly contributes to the ionic conductivity than the ionic concentration (n), should be increased. To this end, it is necessary to decrease the glass transition temperature ($T_g$) or to increase the specific volume ($v_g$) at $T_g$, namely, to decrease crystallinity of the polymer. This is supported by the facts that P. M. Blonsky et al obtained a liquid polymer electrolyte having an ionic conductivity of $1 \times 10^{-4}$ S/cm by using polyphosphazene having $T_g$ of $-83°$ C. which is lower than $T_g$ ($-60°$ C.) of polyethylene oxide (Solid State Ionics, 18819, 258 (1986)) and that M. Watanabe et al obtained a polymer electrolyte having an ionic conductivity of $1 \times 10^{-5}$ S/cm by using cross-linked triol polyethylene oxide having the crystallinity of 30% comparison to he crystallinity of 70% of polyethylene oxide (Polymer Journal, 18(11), 809 (1986)).

SUMMARY OF THE INVENTION

One object of the present invention is to provide a novel ionic conductive polymer electrolyte, particularly a novel lithium ionic conductive polymer electrolyte, which is in the solid state at room temperature.

Another object of the present invention is to provide a lithium cell comprising a novel ionic polymer electrolyte according to the present invention.

These and other objects are accomplished by an ionic conductive polymer electrolyte which comprises a cross linked silicon-containing polymer and a salt and has an ionic conductivity of at least $1 \times 10^{-5}$ S/cm.

DETAILED DESCRIPTION OF THE INVENTION

Figure 1:
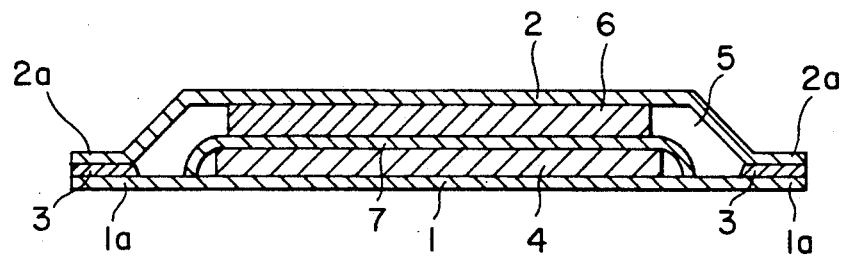
FIG. 1 is a cross section of a lithium cell comprising the polymer electrolyte of the present invention.

The present invention is based on the finding that, when a part of the functional groups of the cross linked triol polyethylene oxide are substituted with a suitable substituent to lower the glass transition temperature and decrease the crystallinity, a polymer electrolyte having good lithium ionic conductivity at room temperature can be obtained.

According to the present invention, to provide an organic polymer having a lower glass transition temperature, polyether glycol is grafted onto a silicon-containing compound such as methyltris(dimethylsiloxyl)silane of the formula:

1,1,2-trimethyldisilane of the formula:

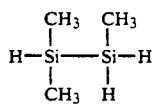

tetra- or penta-methyltrisiloxane of the formula:

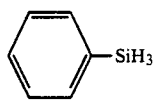

wherein R is a hydrogen atom or a methyl group, phenylsilane of the formula:

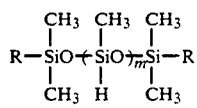

an oligosiloxane hydride of the formula:

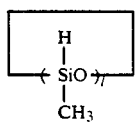

wherein R is the same as defined above and m is a number of 1 to 7, a cyclooligosiloxane hydride of the formula:

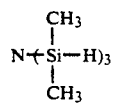

wherein l is a number of 3 to 30, tris(dimethylsilyl)amine of the formula:

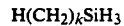

and an alkyl silane of the formula:

$$H(CH_2)_k SiH_3 \quad (VIII)$$

wherein k is a number of 1 to 20.

To lower the glass transition temperature of the produced polymer, the silicon-containing compound preferably has a boiling point not higher than 300° C. Among the above compounds, methyltris(dimethysiloxyl)silane (bp=164° C.), 1,1,2-trimethyldisilane (bp=77° C.), pentamethyltrisiloxane (bp=128° C.) and tetramethylcyclotetrasiloxane (bp=134° C.) are preferred.

To dissolvent the salt in the organic polymer, a polyether glycol having a terminal unsaturated group is preferably grafted onto the silicon-containing compound. Examples of such polyether glycol having the terminal unsaturated group are compounds of the formulae:

$$CH_2=CR(CH_2)_p[(OCH_2CH_2)_qA_{q-1}]_nOH \quad (IX)$$

and $$CH_2=CR-CO-[(OCH_2CH_2)_qA_{q-1}]_nOH \quad (X)$$

wherein R is the same as defined above, A is a divalent group of the formula:

$$-OCH_2C(CH_3)H- \text{ or } -Si(CH_3)_2-O-(CH_2)_s-$$

in which s is a number of 2 to 6; p is 0 or 1, q is a number of 0.1 to 1.0 and n is a number of 1 to 200.

To dissolvent the salt sufficiently, a polymerization ratio ($X=[OCH_2CH_2]/[OCH_2CH_2+A]$) is preferably from 0.1 to 1.0 as defined above. Most preferably, the polymerization ratio X is from 0.6 to 1.0 since the segment A does not dissolve the salt well although it decreases the glass transition temperature of the polymer.

The polyether glycol has a polymerization degree (n) of 1 to 200. When n is zero, no polyether group is introduced in the organic polymer so that the salt cannot be dissolved in the polymer and no ionic conductivity is achieved. When r is larger than 200, it becomes difficult to cross link the organic polymer, so that a considerable amount of uncross linked molecules of the graft polymer are present in the cross linked polymer and the ionic conductivity is greatly deteriorated. More preferably, the polymerization degree (n) is from 5 to 40, since in this range, the cross linked polymer has a low glass transition temperature and the polymer chains move sufficiently.

Preferably, the graft polymer contains at least 20% by weight, more preferably at least 80% by weight of the alkylene oxide groups, particularly the ethylene oxide groups.

In a preferred embodiment, the silicon atom is present in a group of the formula:

$$-Si-CH_2CHR-(CH_2)_p-,$$

$$-Si-O-CHRCH_2-,$$

$$-Si-CH_2CHRCO- \text{ or }$$

$$-Si-O-Si-O-$$

wherein R and p are the same as defined above.

In the grafting of the polyether glycol onto the silicon-containing compound, they are used in such ratio that 0.1 to 2 moles of the hydroxyl groups and/or the unsaturated groups are present per one mole of the SiH groups. The grafting reaction of the hydroxyl group with the SiH group is preferably carried out at a temperature of 20° to 100° C. in the presence of a metal salt such as lead octylate and tin octylate. The grafting reaction of the unsaturated group with the SiH group is preferably carried out at a temperature of 25° to 100° C. in the presence of a catalyst such as hexachloroplatinic acid, salts of hexachloroplatinic acid and ruthenium chloride.

The graft polymer is then cross linked to produce the cross linked polymer to be used in the present invention. When the graft polymer has the hydroxyl groups at the molecular terminals, a difunctional cross linking agent which can reacts with the hydroxyl group is used as a cross linking agent. Examples of the difunctional cross linking agent are diisocyanates (e.g. hexamethylenediisocyanate, 2,4-tolylenediisocyanate, methylenebis(4-phenylisocyanate), xylylenediisocyanate, etc.), diamines (e.g. ethylenediamine, tetramethylenediamine, etc.), dicarboxylic acids (e.g. oxalic acid, malonic acid, succinic acid, isophthalic acid, terephthalic acid, etc.), chlorides of dicarboxylic acids (e.g. succinyl chloride, etc.), methylol compounds (e.g. dimethylurea, etc.), epichlorohydrine, dimethyldichlorosilane and the like.

The cross linking can be carried out at a temperature of 25° to 100° C. for 5 minutes to 2 hours in the presence of a catalyst such as organic tin compounds in case of the diisocyanate cross linking agent. The cross linking agent is used in such amount that from 0.1 to 2.0 moles of the functional groups are present per one mole of the hydroxyl groups. Preferably, an equimolar amount of the denaturated groups are present based on the amount of the hydroxyl group, since the uncross linked graft polymer will decrease the ionic conductivity of the cross linked polymer or react with the salt.

Since the glass transition temperature of the polymer should be decreased, the amide bonding, the urethane bonding, the ester bonding and the ether bonding are preferred in this order as the cross linking sites.

Among the cross linking agents, the aliphatic ones are better than the aromatic ones.

When the graft polymer has the unsaturated groups at the molecular terminals, a compound which can polymerize the product through ring open polymerization is preferably used as the cross linking agent. Examples of such compound are organic peroxides (e.g. cumene hydroperoxide, benzoyl peroxide, lauroyl peroxide, potassium peroxide, butyl hydroperoxide, dicumyl peroxide, di-tert.-butyl peroxide, etc.) and azo compounds (e.g. azobisisobutyronitrile, azobis-2,4-dimethylvaleronitrile, azobiscyclohexanecarbonitrile, etc.).

The amount of the peroxide or the azo compound is from 0.01 to 1 part by weight per 100 parts by weight of the graft polymer.

The cross linking is carried out at a temperature of 25° to 100° C. for 5 minutes to 2 hours.

The graft polymer can be cross linked with a polydimethylsiloxane having the SiH groups at the both molecular terminals of the formula:

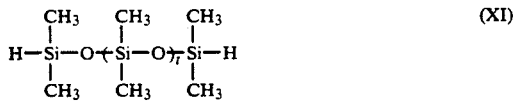

(XI)

wherein t is a number of 1 to 7.

Alternatively, the cross linking may be effected by irradiation of gamma-rays, UV light, visible light or IR light. In this case, care should be taken not to leave the uncross linked graft polymer.

As the salt which is one of the essential components of the polymer electrolyte of the present invention, salts of alkali metals, particularly lithium salts are preferably used. Examples of the lithium salt are LiBr, LiI, LiSCN, LiBF$_4$, LiAsF$_6$, LiClO$_4$, LiCF$_3$SO$_3$, LiC$_6$F$_{13}$SO$_3$, LiHgI and the like.

The amount of the salt is at least 0.1% by weight, preferably from 1 to 30% by weight, particularly from 3 to 20 parts by weight based on the weight of the cross linked polymer.

The composite polymer electrolyte of the present invention is prepared by a conventional process. For example, the cross linked polymer is immersed in a solution of the salt in an organic solvent to absorb the salt in the cross linked polymer and then removing the solvent by evaporation.

By immersing the cross linked polymer in the solution of the salt, the salt bonds with the etheric oxygen in the cross linked polymer while forming a complex. Therefore, after the removal of the solvent, the salt remains in the polymer, and the composite polymer electrolyte of the present invention is obtained.

The form of the polymer electrolyte depends on its end use. For example, when the polymer electrolyte of the present invention is used as an electrolyte of a lithium cell and acts as a separator between a positive and negative electrodes, it is in the form of a sheet.

To produce a sheet form polymer electrolyte, the cross linked polymer is molded in a sheet and immersed in the solution of the salt in the organic solvent. After absorbing the metal ion in the cross linked polymer, the organic solvent is evaporated off to obtain the sheet form polymer electrolyte. In the present invention, a very thin polymer electrolyte film having a thickness in a micron order can be produced.

When the polymer electrolyte of the present invention is used as the positive electrode of the lithium cell, the uncross linked graft polymer, a radical polymerization initiator, a positive electrode active material and other additives are mixed to react the unsaturated groups in the graft polymer to cross link, followed by molding. Then, the molded material is immersed in the solution of the lithium salt in the organic solvent, followed by evaporation off of the solvent. Thereby, the polymer electrolyte and the positive electrode active material are integrally molded in a mixed state.

As the organic solvent, any solvent in which the salt can be dissolved but which does not react with the cross linked polymer may be used. Examples of the organic solvent are acetone, tetrahydrofuran, dimethoxyethane, dioxolan, propylene carbonate, acetonitrile, dimethylformamide and the like.

In view of good ionic conductivity, the composite of the linked polymer and the salt preferably has a crystallinity of not larger than 30%, more preferably not larger than 12%. In the most preferable case, the composite is amorphous. In addition, the composite has a glass transition temperature of not higher than −40° C., preferably not higher than −50° C.

Preferably, the cross linked polymer has a dynamic loss modulus of not larger than $1 \times 10^9$ dyne/cm$^2$, more preferably not larger than $1 \times 10^6$ dyne/cm$^2$ at 25° C.

The cross linked polymer of the present invention preferably has a rubbery elasticity. In a preferred embodiment, the cross linked polymer of the present invention has a dynamic storage elastic modulus of at least $1 \times 10^8$ dyne/cm$^2$ at 25° C.

FIG. 1 shows a cross section of one embodiment of the lithium cell comprising the polymer electrolyte of the present invention. The cell comprises a square positive current collecting plate 1 made of a stainless steel plate, a negative current collecting plate 2 in the form of a shallow saucer made of a stainless steel plate a periphery of which is stepwise folded to form a flat part 2a in parallel with the main face of the plate 2 and an adhesive which bonds the peripheries 1a and 2a of the plates 1 and 2. The positive electrode 4 is composed of a mixture of the polymer electrolyte of the present invention and the positive electrode active material as described above and placed on the positive current collecting plate side in a space 5 formed between the plates 1 and 2. The negative electrode 6 consists of a lithium metal or a lithium alloy and placed on the negative current collecting plate side in the space 5. The positive and negative electrodes 4 and 6 are separated by a separator 7 which is formed from the polymer electrolyte of the present invention.

The positive electrode 4 may be in the form of a sheet prepared from a mixture of the positive electrode active material, a binder such as polytetrafluoroethylene and a current conducting aid.

Examples of the positive electrode active material are chalcogenides (e.g. $TiS_2$, $MoS_2$, VSe, etc.), vanadium oxide (e.g. $V_6O_{13}$, $V_2O_5$, etc.), cobalt oxides, manganese oxide, $NiPS_3$, conductive polymers (e.g. polyaniline, polypyrrole, polythiophene, etc.) as well as mixtures thereof.

Since the separator 7 consists of the sheet form polymer electrolyte of the present invention and the positive electrode 4 consists of a sheet comprising the polymer electrolyte of the present invention, the cell can be made thin, and the productivity of the cells and reliability of sealing of the cells are improved. The cells are substantially free from leakage of the electrolyte. In addition, since the polymer electrolyte has good lithium ion conductivity, a primary cell has excellent discharge performance and a secondary cell has excellent charge and discharge cycle performance.

PREFERRED EMBODIMENTS OF THE INVENTION

The present invention will be illustrated by following Examples.

EXAMPLE 1

A mixture of methyltris(dimethylsiloxyl)silane (manufactured by Toray) (2.6 g), allylated polyethylene glycol having an average molecular weight of 1000 (manufactured by Nippon Oil & Fat) (20 g) and potassium chloroplatinate (2 mg) was reacted at 100° C. for 3 hours while stirring to obtain a graft polymer.

With the graft polymer (10 g), butyl vinyl ether (6 g) was reacted at 100° C. for 18 hours in the presence of mercury acetate as a catalyst to convert the OH groups to the vinyl groups.

To the graft polymer having the terminal vinyl groups, azobisisobutyronitrile (1 to 2 mg) was added. The mixture was heated on an aluminum plate kept at 100° C. for one hour in an argon atmosphere to obtain a cross linked polymer.

The cross linked polymer was peeled off from the aluminum plate and washed in acetone to remove the unreacted materials.

The washed polymer was immersed in a 2 wt. % solution of $LiBF_4$ in acetone for 8 hours to impregnate the polymer with $LiBF_4$ followed by evaporation of the acetone to obtain a sheet form polymer electrolyte having a thickness of 0.1 mm.

EXAMPLE 2

To the graft polymer (10 g) prepared in the same manner as in Example 1, hexamethylenediisocyanate (0.84 g) was added and the mixture was heated at 100° C. for 3 hours in the presence of tin butyl laurate as a catalyst for urethane formation to obtain a cross linked polymer. Thereafter, in the same manner as in Example 1, a polymer electrolyte was produced.

EXAMPLE 3

A mixture of methyltris(dimethylsiloxyl)silane (2.6 g), the same allylated polyethylene glycol as used in Example 1 (20 g) and zinc octylate (2 mg) was reacted at 100° C. for 5 hours while stirring to obtain a graft polymer.

To the graft polymer (10 g), polydimethylsiloxane having the SiH groups at both molecular ends and a molecular weight of 208.5 (manufactured by Chisso) (1 g) and a catalytic amount of potassium chloroplatinate was added. The mixture was heated on an aluminum plate kept at 100° C. for 6 hours in an argon atmosphere to obtain a cross linked polymer. Thereafter, in the same manner as in Example 1, a polymer electrolyte was produced.

EXAMPLE 4

The graft polymer prepared in the same manner as in Example 3 was irradiated with electron rays to obtain a cross linked polymer. Thereafter, in the same manner as in Example 1, a polymer electrolyte was produced.

EXAMPLE 5

To the graft polymer prepared in the same manner as in Example 3 (10 g) and 35% sulfuric acid (0.5 ml) were added and shaken at room temperature for 9 hours followed by kept standing at 0° C. overnight. Then, the mixture was neutralized with an aqueous solution of sodium hydroxide at a temperature not higher than 5° C. to convert the terminal allyl groups to the hydroxyl groups. Then, in the same manner as in Example 2, a polymer electrolyte was produced.

EXAMPLE 6

A mixture of methyltris(dimethylsiloxyl)silane (2.6 g), the same allylated polyethylene glycol as used in Example 1 (20 g) and zinc octylate (10 mg) was reacted at 100° C. for 5 hours while stirring to obtain a graft polymer.

Then, in the same manner as in Example 1, the graft polymer was cross linked with azobisisobutyronitrile and a polymer electrolyte containing $LiBF_4$ was produced.

EXAMPLE 7

In the same manner as in Example 2 but using methyltris(dimethylsiloxyl)silane (2.6 g) and allylated polyethylene glycol having an average molecular weight of 550 (manufactured by Nippon Oil & Fat) (11 g), a sheet form polymer electrolyte was produced.

EXAMPLE 8

In the same manner as in Example 2 but using methyltris(dimethylsiloxyl)silane (2.6 g) and allylated polyethylene glycol having an average molecular weight of 2000 (manufactured by Nippon Oil & Fat) (40 g), a sheet form polymer electrolyte was produced.

EXAMPLE 9

In the same manner as in Example 2 but using methyltris(dimethylsiloxyl)silane (2.6 g) and allylated polyethylene glycol having an average molecular weight of 1100 (manufactured by Nippon Oil & Fat, a polymerization molar ratio of ethylene oxide to propylene oxide of 75:25) (22 g), a sheet form polymer electrolyte was produced.

EXAMPLE 10

In the same manner as in Example 2 but using pentamethyltrisiloxane (1 g) in place of methyltris(dimethylsiloxyl)silane, a sheet form polymer electrolyte was produced.

EXAMPLE 11

In the same manner as in Example 2 but using tetramethylcyclotetrasiloxane (2.4 g) in place of methyltris(dimethylsiloxyl)silane, a sheet form polymer electrolyte was produced.

EXAMPLE 12

In the same manner as in Example 2 but using 1,1,2-trimethyldisilane (1.0 g) in place of methyltris(dimethylsiloxyl)silane, a sheet form polymer electrolyte was produced.

EXAMPLE 13

In the same manner as in Example 2 but using phenylsilane (1.08 g) in place of methyltris(dimethylsiloxyl)silane, a sheet form polymer electrolyte was produced.

EXAMPLE 14

In the same manner as in Example 2 but using tris(dimethylsillyl)silane (1.91 g) in place of methyltris(dimethylsiloxyl)silane, a sheet form polymer electrolyte was produced.

EXAMPLE 15

In the same manner as in Example 2 but using n-octylsilane (1.44 g) in place of methyltris(dimethylsiloxyl)silane, a sheet form polymer electrolyte was produced.

COMPARATIVE EXAMPLE 1

In acetonitrile (5 ml), polyethylene oxide having an average molecular weight of 60,000 (1 g) and $LiBF_4$ (0.326 g) were dissolved and stirred to obtain a homogeneous solution. The resulting viscous solution was dropped on a glass plate and kept standing in an argon atmosphere under atmospheric pressure for 5 hours. Then, the mixture was treated under reduced pressure of $1\times10^{-2}$ Torr. at 100° C. for 10 hours to remove acetonitrile to obtain a sheet from polymer electrolyte having a thickness of 0.1 mm.

COMPARATIVE EXAMPLE 2

In the same manner as in Comparative Example 1 but using polyethylene oxide triol having an average molecular weight of 3000 (manufactured by Daiichi Kogyo Seiyaku), a sheet form polymer electrolyte was produced.

With the cross linked polymer and the polymer electrolytes produced in Examples and Comparative Examples, the glass transition temperature and crystallinity of the cross linked polymers, and ionic conductivity of the polymer electrolytes and internal resistance of cells comprising the polymer electrolytes were measured.

The glass transition temperature is defined as a peak temperature which is determined by measuring temperature changes of tanδ with a sheet of the cross linked polymer (3 mm×40 mm×0.5 mm) by the pulling method using a dynamic viscoelastometer (Rheovibron DDV-II manufactured by Orientech).

The crystallinity is calculated from a peak area in a differential scanning calorimetric chart measured at a heating rate of 5° C./min. by means of a differential scanning calorimeter (DSC-30 manufactured by Shimadzu).

The ionic conductivity at 25° C. is measured by sandwiching the polymer electrolyte between a pair of Li foils as electrodes and measuring AC impedance between the electrodes.

The polymer electrolyte cell had the structure of FIG. 1 in which the total thickness was 1 mm and an edge length of 1 cm. As the negative electrode, a lithium/aluminum alloy was used. As the positive electrode, a sheet made of a mixture of the polymer electrolyte and $TiS_2$ in a weight ratio of 1:2 was used.

Figure 2:
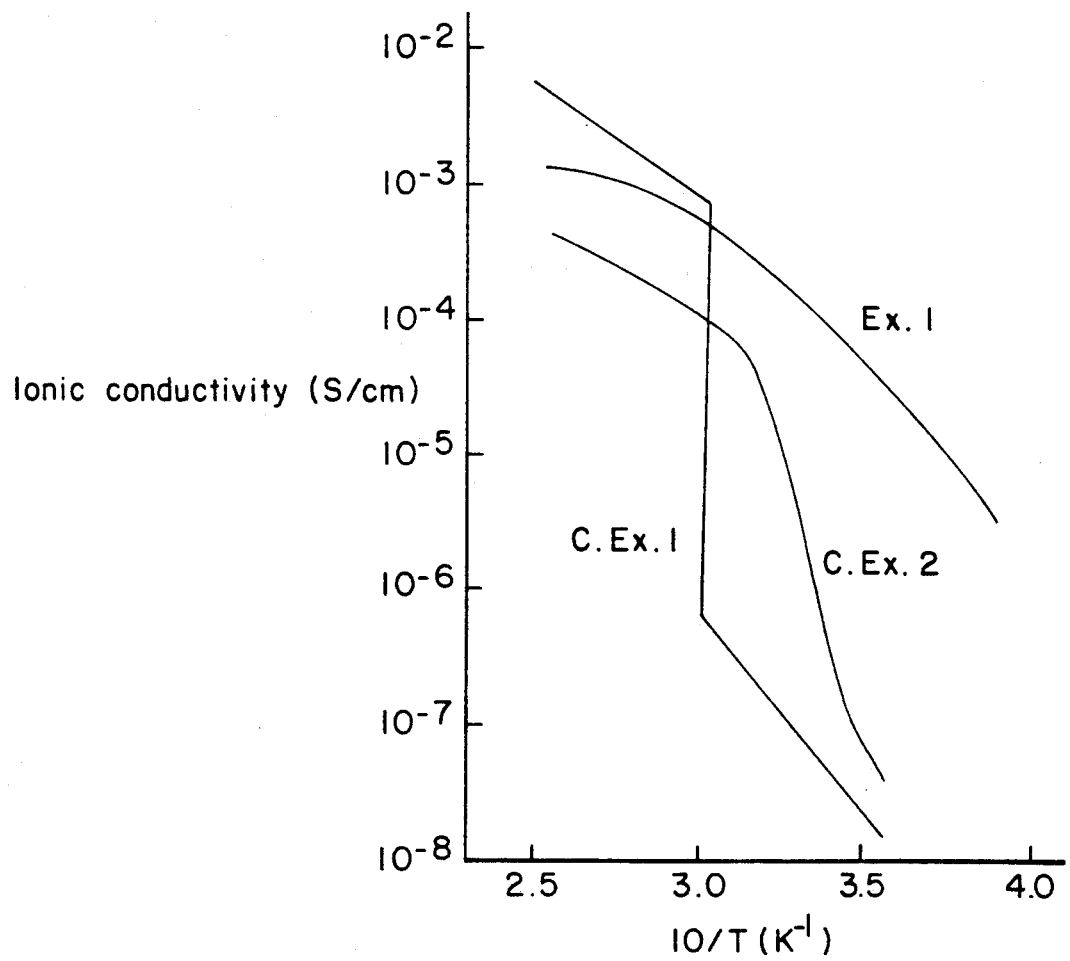
FIG. 2 is a graph showing dependency on temperature of the ionic conductivity of the polymer electrolytes produced in Example 1 and Comparative Examples 1 and 2.

The results are shown in Table. The dependency of the ionic conductivity on temperature in Example 1 and Comparative Examples 1 and 2 is shown in FIG. 2.

TABLE

| Ex. No. | $T_g$ (°C.) | Crystallinity (%) | Ionic conductivity (S/cm) | Internal resistance of cell (ohm) | Dynamic loss modulus (dyne/cm$^2$) | Dynamic storage elastic modulus (dyne/cm$^2$) |
|---|---|---|---|---|---|---|
| 1 | −60 | 0 | $1 \times 10^{-4}$ | 100 | $2 \times 10^4$ | $6 \times 10^6$ |
| 2 | −55 | 0 | $3 \times 10^{-5}$ | 333 | $1 \times 10^5$ | $1 \times 10^8$ |
| 3 | −58 | 0 | $6 \times 10^{-5}$ | 167 | $4 \times 10^4$ | $1 \times 10^7$ |
| 4 | −57 | 0 | $5 \times 10^{-5}$ | 200 | $5 \times 10^4$ | $2 \times 10^7$ |
| 5 | −55 | 0 | $3 \times 10^{-5}$ | 330 | $1 \times 10^5$ | $1 \times 10^8$ |
| 6 | −55 | 0 | $3 \times 10^{-5}$ | 333 | $1 \times 10^5$ | $1 \times 10^8$ |
| 7 | −53 | 0 | $2 \times 10^{-5}$ | 500 | $1.4 \times 10^5$ | $1.2 \times 10^8$ |
| 8 | −53 | 10 | $2 \times 10^{-5}$ | 500 | $1.4 \times 10^5$ | $1.2 \times 10^8$ |
| 9 | −53 | 0 | $2 \times 10^{-5}$ | 500 | $1.4 \times 10^5$ | $1.2 \times 10^8$ |
| 10 | −56 | 0 | $4.0 \times 10^{-5}$ | 250 | $6 \times 10^4$ | $3 \times 10^7$ |
| 11 | −55.3 | 0 | $2.5 \times 10^{-5}$ | 285 | $8 \times 10^4$ | $5 \times 10^7$ |
| 12 | −55 | 0 | $3.0 \times 10^{-5}$ | 333 | $1.0 \times 10^5$ | $1.0 \times 10^8$ |
| 13 | −54 | 0 | $2.5 \times 10^{-5}$ | 400 | $1.2 \times 10^5$ | $1.0 \times 10^8$ |
| 14 | −53 | 0 | $2.0 \times 10^{-5}$ | 500 | $1.4 \times 10^5$ | $1.2 \times 10^8$ |
| 15 | −53 | 0 | $2.0 \times 10^{-5}$ | 500 | $1.4 \times 10^5$ | $1.2 \times 10^7$ |
| C1 | −60 | 70 | $1 \times 10^{-7}$ | 10,000 | $4 \times 10^7$ | $7 \times 10^6$ |
| C2 | −51 | 30 | $1.0 \times 10^{-5}$ | 1,000 | $2 \times 10^5$ | $2 \times 10^8$ |

As understood from the above results, all the cross linked polymers prepared in Examples 1 to 15 had the crystallinities of not larger than 10% and the low glass transition temperatures of −53° to −60° C. Therefore, the polymer electrolytes produced from such cross linked polymers had the ionic conductivities of $2\times10^{-5}$ to $1\times10^{-4}$ S/cm, which were higher than those in Comparative Examples, namely $1\times10^{-7}$ and $1\times10^{-5}$ S/cm. In addition, the cells comprising the polymer electrolytes of the present invention had the smaller internal resistance than those comprising the polymer electrolytes of Comparative Examples.

What is claimed is:

1. A sheet form ionic conductive polymer electrolyte in a solid state which comprises a cross linked silicon-containing polymer and a salt and has an ionic conductivity of at least $1 \times 10^{-5}$ S/cm. at 25° C.

2. The ionic conductive polymer electrolyte according to claim 1, wherein a composite of said cross linked polymer and said salt has an ionic conductivity of at least $2 \times 10^{-5}$ S/cm at 25° C.

3. The ionic conductive polymer electrolyte according to claim 1, wherein said cross linked polymer has a crystallinity of not more than 30%.

4. The ionic conductive polymer electrolyte according to claim 3, wherein said cross linked polymer has a crystallinity of not more than 12%.

5. The ionic conductive polymer electrolyte according to claim 3, wherein said cross linked polymer is amorphous.

6. The ionic conductive polymer electrolyte according to claim 1, wherein said cross linked polymer has a glass transition temperature of not higher than −40° C.

7. The ionic conductive polymer electrolyte according to claim 6, wherein said cross linked polymer has a glass transition temperature of not higher than −50° C.

8. The ionic conductive polymer electrolyte according to claim 1, wherein said cross linked polymer has dynamic loss modulus of not larger than $1 \times 10^9$ dyne/cm$^2$ at 25° C.

9. The ionic conductive polymer electrolyte according to claim 8, wherein said cross linked polymer has dynamic loss modulus of not larger than $1 \times 10^6$ dyne/cm$^2$ at 25° C.

10. The ionic conductive polymer electrolyte according to claim 1, wherein said cross linked polymer comprises at least 20% by weight of alkylene oxide units.

11. The ionic conductive polymer electrolyte according to claim 10, wherein said cross linked polymer comprises at least 80% by weight of alkylene oxide units.

12. The ionic conductive polymer electrolyte according to claim 10, wherein the alkylene oxide units are ethylene oxide units.

13. The ionic conductive polymer electrolyte according to claim 1, wherein the silicon atom in said polymer is present in a group of the formula:

—Si—CH$_2$CHR—(CH$_2$)$_p$—,

—Si—O—CHRCH$_2$—,

—Si—CH$_2$CHRCO— or

—Si—O—Si—O— wherein R is a hydrogen atom or a methyl group and p is 0 or 1.

14. The ionic conductive polymer electrolyte according to claim 13, wherein said group is —Si—CH$_2$CH$_2$—.

15. The ionic conductive polymer electrolyte according to claim 1, wherein said salt is a salt of an alkali metal.

16. The ionic conductive polymer electrolyte according to claim 15, wherein said alkali metal is lithium.

17. The ionic conductive polymer electrolyte according to claim 1, wherein said salt forms a complex with said cross linked polymer.

18. The ionic conductive polymer electrolyte according to claim 1, wherein said salt is contained in an amount of at least 0.1% by weight based on the weight of said cross linked polymer.

19. The ionic conductive polymer electrolyte according to claim 18, wherein said salt is contained in an amount of 1 to 30% by weight based on said cross linked polymer.

20. The ionic conductive polymer electrolyte according to claim 18, wherein said salt is contained in an amount of 3 to 20% by weight based on said cross linked polymer.

21. The ionic conductive polymer electrolyte according to claim 1, wherein said cross linked polymer has a dynamic storage elastic modulus of at least $1 \times 10^8$ dyne/cm$^2$ at 25° C.

22. The ionic conductive polymer electrolyte according to claim 1, wherein said cross linked polymer is prepared by cross linking a graft polymer comprising an organic silicon-containing compound having at least one SiH group and a polyether glycol having a terminal unsaturated group which is grafted onto said silicon-containing compound.

23. The ionic conductive polymer electrolyte according to claim 22, wherein said silicon-containing compound has a boiling point not higher than 300° C.

24. The ionic conductive polymer electrolyte according to claim 1, wherein said silicon-containing compound is at least one member selected from the group consisting of methyltris(dimethylsiloxyl)silane, 1,1,2-trimethyldisilane, tetramethyltrisilane, phenylsilane, oligosiloxane hydride, cyclooligosiloxane hydride, tris(dimethylsilyl)amine and an alkylsilane.

25. The ionic conductive polymer electrolyte according to claim 22, wherein said polyether glycol comprises ethylene oxide units.

26. The ionic conductive polymer electrolyte according to claim 22, wherein said cross linked polymer is prepared through a reaction between said SiH group of said organic silicon-containing compound and said unsaturated group of said polyether glycol.

27. The ionic conductive polymer electrolyte according to claim 22, wherein said cross linked polymer is prepared through a reaction between said SiH group of said organic silicon-containing compound and a hydroxyl group of said polyether glycol.

28. The ionic conductive polymer electrolyte according to claim 22, wherein terminals of said graft polymer are modified with functional groups.

29. The ionic conductive polymer electrolyte according to claim 28, wherein said denaturated group is selected from the group consisting of a vinyl group and a hydroxyl group.

30. The ionic conductive polymer electrolyte according to claim 28, wherein said denaturated group is a hydroxyl group.

31. The ionic conductive polymer electrolyte according to claim 28, wherein said functional group is a vinyl group.

32. The ionic conductive polymer electrolyte according to claim 21, wherein said graft polymer is cross linked with a cross linking source selected from the group consisting of an organic peroxide, an azo compound, a polydimethylsiloxane having SiH groups at both molecular terminals, gamma rays, electron beams, UV light, visible light and IR light.

33. The ionic conductive polymer electrolyte according to claim 22, wherein said graft polymer is cross linked with at least one cross linking agent selected form the group consisting of a diisocyanate, a diamine, a dicarboxylic acid, a halide of a dicarboxylic acid, a methylol compound, epichlorohydrin and dimethyldichlorosilane.

34. A cell comprising a positive electrode, a negative electrode and a polymer electrolyte consisting of an ionic conductive polymer electrolyte which comprises a cross linked silicon-containing polymer and a salt and has an ionic conductivity of at least $1 \times 10^{-5}$ S/cm.

35. The cell according to claim 34, wherein said negative electrode consists of a lithium metal selected from the group consisting of metal lithium and a lithium alloy.

36. The cell according to claim 34, wherein said positive electrode comprises at least one compound selected from the group consisting of a chalcogenide, a vanadium oxide, a cobalt oxide, a manganese oxide, and a conductive polymer.

* * * * *